3,011,093
Patented Nov. 28, 1961

3,011,093
SURGE SUPPRESSOR FOR WELDER
Alec H. B. Walker, Radlett, England, assignor to Westinghouse Electric Corporation, East Pittsburgh, Pa., a corporation of Pennsylvania
Filed Dec. 18, 1959, Ser. No. 860,574
7 Claims. (Cl. 315—141)

This invention relates to the art of arc welding, arc melting or the like, and has particular relationship to apparatus for supplying power particularly in large quantities of the order of tens of thousands of amperes for arc welding and arc melting through rectifiers of the silicon-diode type. The invention in its specific aspects is intimately related to arc welding or arc melting and solves problems arising particularly in, and peculiar to, arc welding and arc melting. In its broader aspects this invention may be applied to loads of other types than arc welding or arc melting loads.

In using arc welding or arc melting apparatus of the prior art type, excessive failures of the diodes has been encountered. The cause of the failures is not readily apparent. It does not appear to result from normal overloading of the diodes by load current and the incidence of the failures cannot be materially reduced by increasing the number of parallel diode units or bridges through which the load current is transmitted.

It is an object of this invention to provide apparatus for supplying substantial quantities of power for arc welding and arc melting or other power applications through rectifiers of the silicon-diode type in the use of which the above described failure of diodes shall be minimized or entirely eliminated.

This invention arises from the discovery that the excessive failures of diodes is caused by the occurrence of voltage transients of relatively high magnitude both cyclic and random during an arc melting or arc welding operation. It has been found that, depending on load circuit conditions involving (or which could give rise to) transients, inductance and like characteristics of the load, transient voltages either of cyclic or random nature are produced. These transients are accentuated by the highly irregular operation of the arc. The rapid irregular fluctuation of the arc between short-circuit and open circuit conditions produces sharp changes in the energy stored even in small inductances and capacitances in the supply circuit for the arc and the resulting sharp transients in the supply circuit for the arc. This condition is further accentuated where the supply is of the three-phase rectifier type particularly during the transition intervals between phases.

The transients which produce excessive failure of diodes might be caused even by the reactance of the conductors between the output terminals of a supply and the load. It has been demonstrated that if a three-phase rectifier power supply is loaded with a resistance load and the secondary or load leads are short, the voltage wave form taken across the secondary terminals are of normal ripple with no spikes. Such normal ripple for a $3\phi$ full wave rectifier is of the order of only 5%. But if long cables are connected between the resistance load and the power unit the voltage wave form taken across the resistance load differs from the wave form taken across the terminals of the power unit. In other words the effect of the cable inductance is to amplify the ripple and produce the voltage (cyclic) peaks or spikes. Arc melting installations have inherently high secondary bus or cable inductance and these lead to high ripple amplitudes. The transient character of the arc load tends to make the condition even worse by triggering oscillations other than the ripple frequency. These voltage spikes are in effect the result of tuned circuit oscillations governed by the capacitance and inductance of the secondary circuit components, the rectifier representing almost an open end condition with very small capacitance.

In accordance with this invention, the failure of the silicon diodes is minimized or entirely eliminated by connecting between the electrode and the work a network for absorbing the excessive voltage built up on the interruption of the arc. This network includes a capacitor of substantial capacity which is connected between the electrode and work conductors through a rectifier which is preferably of the silicon-diode type. The rectifier is poled so as to conduct positive current from the electrically positive part to the electrically negative part. That is, in welding or melting at straight polarity, the rectifier is connected to conduct positive current between the work and the electrode and in welding at reverse polarity the rectifier is connected to conduct positive current between the electrode and the work. The suppressor network should be connected as near to the rectifier output terminals as practicable.

During the intervals during which the arc is fired, the capacitor is charged through the rectifier substantially to the potential across the arc. When the arc is interrupted, any tendency of the voltage between the electrode and the work to exceed the potential impressed on the capacitor is suppressed by the flow of current through the rectifier to the capacitor. Because the capacitor is large no appreciable rise in potential across the capacitor occurs. Because the capacitor is very large, the capacitors used are of the electrolytic type. Such capacitors have a low current carrying facility. The rectifier is included in the suppressor circuit to prevent the alternating current component of the load current from flowing through the capacitors. This alternating current component would produce capacitor current far beyond the capabilities of electrolytic capacitors. In the absence of the rectifier the alternating current which would flow would be not only the three-phase ripple current but also the variations produced by the fluctuation of the arc and the spikes both random and cyclic.

The novel features considered characteristic of this invention, are disclosed generally above. The invention itself both as to its organization and as to its method of operation together with additional objects and advantages thereof will be understood from the following description of a specific embodiment taken in connection with the accompanying drawings in which.

Figure 1:
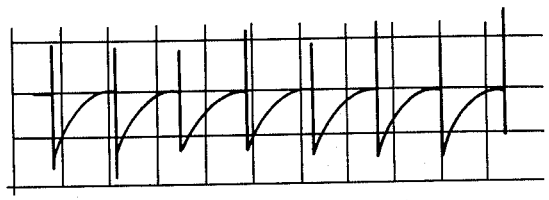
FIGURE 1 is an oscillogram illustrating the operation of prior art apparatus.

FIGURE 1 is an oscillogram of the voltage wave across the load produced in the actual operation of arc melting apparatus of the prior art type. This arc-melting apparatus was supplied through a plurality of silicon-diode bridge units connected in parallel. The load current was of the order of 20,000 amperes.

In FIG. 1, voltage is plotted vertically and time horizontally to the left. Vertically, each block into which FIG. 1 is subdivided represents 20 volts; horizontally, each block represents 2 milliseconds.

The oscillogram was taken at the direct current load terminals of the apparatus, across the arc, and as appears from FIG. 1, the waveform of this voltage has an unusually high ripple characteristic, the usual ripple amplitude of three phase full wave rectified voltage being of the order of only 5% of the D.C. amplitude. In addition to the ripple there are transients which appear in FIG. 1 as spikes. As can be determined by counting the blocks, the spike voltage is of the order of 70 to 80 volts and a spike occurs during each transition of conduction from one phase to the succeeding phase. It is these spikes which unduly stress the diodes and produce the excessive failures of the diodes. In addition there are random spikes not shown in FIG. 1.

Figure 2:
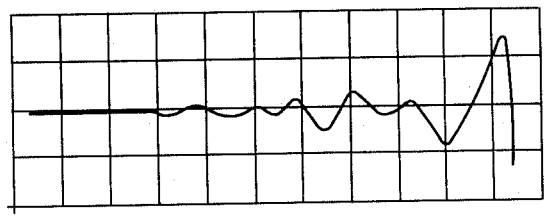
FIG. 2 is an oscillogram showing the waveform of the transient which occurs in prior art apparatus.

The character of the transients represented by these spikes is shown by the oscillogram presented in FIG. 2. In this oscillogram voltage is plotted vertically and time horizontally to the left. The oscillogram is subdivided into blocks. Vertically, each block represents 20 volts and horizontally each block represents 5 microseconds. An analysis of FIG. 2 reveals that the frequency of oscillation of the spikes is of the order of 180 kilo-cycles.

Figure 3:
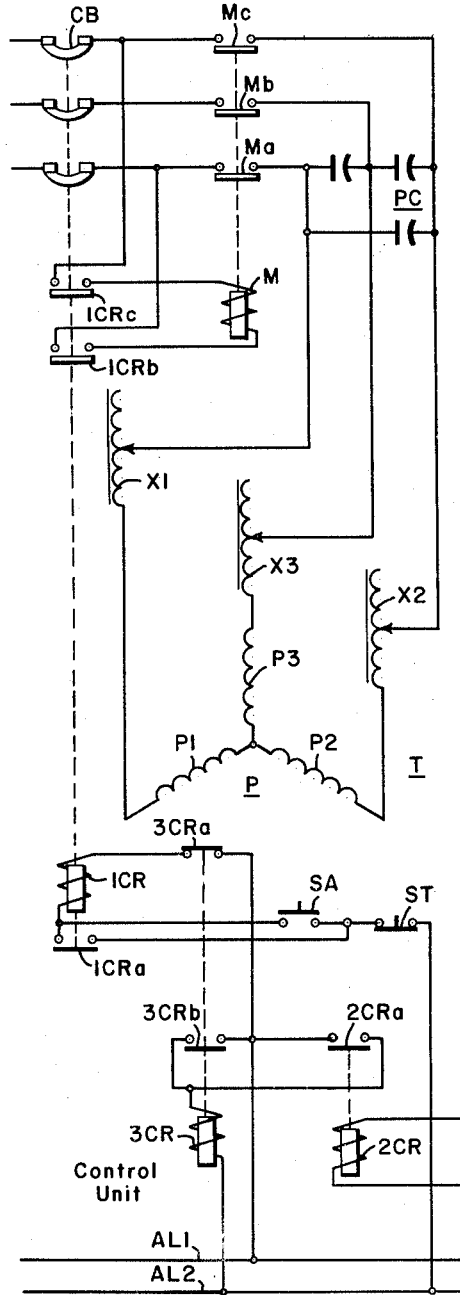
FIG. 3 is a schematic of a preferred embodiment of this invention.
Figure 3:
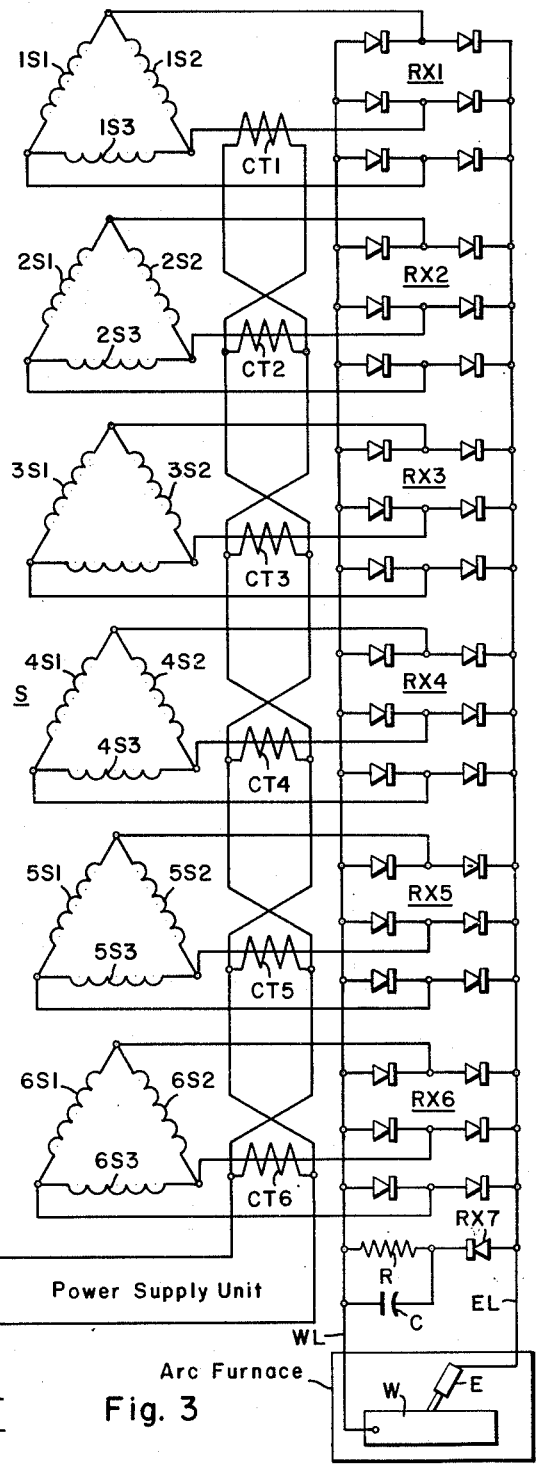

The apparatus shown in FIG. 3 includes an arc furnace, a power supply unit and a control unit. This apparatus is supplied from conductors 1L1, 1L2 and 1L3 which may be connected to the buses of a three phase, 60 cycle power supply through a circuit breaker CB.

The arc furnace may be of any conventional type and includes work W in the form of a mass of metal which may be melted or converted from one form into another and an electrode E. The work W may, for example, be a mass of zirconium which is being deposited from a zirconium electrode E as it is melted by the heat of the arc.

The power supply unit includes a polyphase transformer having a single primary P and a secondary S consisting of a plurality of separate secondary windings 1S1, 1S2, 1S3 through 6S1, 6S2, 6S3. The primary P has a plurality of windings P1, P2, P3 connected in star.

The winding P1 is adapted to be connected to conductor 1L3 through a reactor X1 and the contact Ma of a contactor M. The winding P3 is adapted to be connected through reactor X3 and contact Mb of contactor M to conductor 1L2. The winding P2 is adapted to be connected to 1L1 through reactor X2 and contact Mc of contactor M. Transformer P is then powered when the circuit breaker CB is closed and contactor M is actuated. Power factor correcting capacitors PC are connected across the terminals of the reactors X1–X3, X3–X2, and X1–X3.

The secondary windings 1S1, 1S2, 1S3 through 6S1, 6S2, 6S3 are each connected in delta and each delta is connected to supply a rectifier bridge RX1 through RX6. The bridges RX1 through RX6 are each preferably composed of silicon diodes. The positive terminals of the bridges RX1 through RX6 are connected together to the electrode conductor EL which is connected to the electrode E. The negative terminals of the bridges RX1 through RX6 are connected to the work conductor WL which is connected to the work W. Usually, the work W will be grounded and the negative terminals of the rectifiers may in the apparatus illustrated be connected to a ground common with the work W.

In the apparatus actually shown in FIG. 3, the melting is at reverse polarity. The melting may also take place at straight polarity at which case the electrode conductor EL is connected to the negative terminals of the bridges RX1 through RX6 and the work conductor WL to the positive terminals of the bridges.

One of the conductors connected between each secondary delta and an associated terminal on the correspond bridge RX1 through RX6 includes a current transformer winding CT1 through CT6. The windings CT1 through CT6 are connected oppositely on pairs; that is, CT1 and CT2 are connected oppositely CT3 and CT4 are connected oppositely and CT5 and CT6 are connected oppositely. The coil of a relay 2CR capable of detecting an unbalance in the current flow through the oppositely connected windings is connected across the secondaries CT1 through CT6. The relay 2CR has a front contact 2CRa. The control unit includes the contactor M, a relay 1CR and a relay 3CR. The relay 3CR has a back contact 3CRa and a front contact 3CRb. The relay 1CR has front contacts 1CRa and 1CRb.

In arriving at this invention, it has been found that the transients shown in FIG. 1 and the random transients may be effectively suppressed by a network connected between the output terminals of the rectifiers RX1 through RX6 by leads which are as small as practicable and which have a minimum of distributed inductance and capacity. This network includes a high capacitor C shunted by a resistor R. The capacitor-resistor network C–R is connected between these terminals through a rectifier, usually a silicon diode, poled to conduct positive current from the positive terminals of the rectifiers RX1 through RX6 to the negative terminals of these rectifiers. The control unit is supplied from auxiliary conductors AL1 and AL2 which supply single alternating current and may be connected through a transformer (not shown) to two of the conductors L1, L2 and L3.

The coil of 1CR is adapted to be connected between conductors AL1 and AL2 through back contact 3CRa, the start push-button SA and a stop push-button ST. The start push-button SA is adapted to be shunted by the front contact 1CRa of relay 1CR. The coil of 3CR is adapted to be connected between conductors AL1 and AL2 through front contacts 2CRa and to be locked in through front contact 3CRb. The coil of the contactor M is adapted to be connected between conductors 1L1 and 1L3 through front contact 1CRb.

In the standby condition of the apparatus, the circuit breaker CB is closed and conductors 1L1, 1L2 and 1L3 and AL1 and AL2 are energized. But the start push-button is open so that 1CR is deenergized and contactor M is deenergized. Transformer T is then deenergized and there is no potential between conductors EL and WL. In the absence of potential on transformer T, relay 2CR is deenergized and relay 3CR is deenergized.

In the operation of the apparatus, start pushbutton SA is closed causing relay 1CR to be energized. Relay 1CR is then locked in through 1CRa and contactor M is actuated through 1CRb energizing transformer T. There is now potential between EL and WL. When potential first appears between conductors EL and WL the capacitor C is charged through the rectifier RX7 to the peak potential between the conductors EL and WL.

An arc may be fired by contacting the electrode E and the work W and removing the electrode from the work. Current then flows through the electrode E and the work W to produce the desired melting. When the arc is fired, the potential between EL and WL is reduced to the magnitude of the arc voltage but the rectifier RX7 prevents any substantial discharge of the capacitor C through the arc. As the arc burns, there may be a tendency of the potential to rise as manifested by the spikes of FIG. 1. Any such tendency is suppressed by the network C–R because when the potential exceeds the charge on capacitor C, current flows through the rectifier RX7 to increase the charge of capacitor C. Because the capacitor C is very large its potential is not materially increased because the tendency of the voltage between WL and EL to increase is of very short duration. The capacitor C acts essentially as an integrating capacitor and the resistor R maintains the capacitor C sufficiently discharged to perform its spike absorbing operation and prevents any high voltage from remaining on capacitor C.

In a typical situation, the capacitor C should have a total capacity of about 8,000 microfarads per 2500 amperes load and the corresponding resistor R should have a resistance of 300 ohms. For a 20,000 ampere load the capacity should be about 80,000 microfarads and the resistance 30 ohms.

Figure 4:
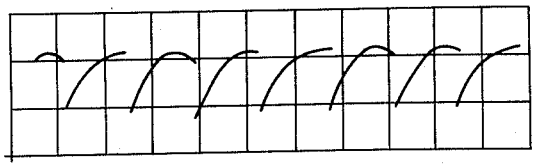
FIG. 4 is an oscillogram showing the waveform of the output voltage produced in the operation of the apparatus shown in FIG. 3; and, FIG. 5 is an oscillogram showing the transient produced in the operation of the apparatus shown in FIG. 3.

FIG. 4 is an oscillogram of the potential between EL and WL during an arc melting operation. Voltage is plotted vertically and time horizontally to the left. In FIG. 4, each block corresponds to 20 volts vertically and 2 milliseconds horizontally. Comparison of FIG. 4 and FIG. 1 reveals that the spikes which appear in FIG. 1 are substantially suppressed in FIG. 4. This shows that the network C-R is highly effective in suppressing the incidence of excessive voltage.

Figure 5:
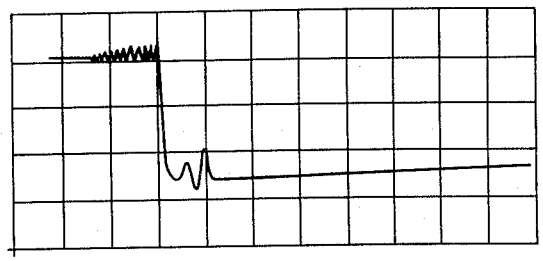

FIG. 5 shows an analysis of the potential spikes during each transition from one phase to the other. Each block in FIG. 5 corresponds to 10 volts vertically and to 25 microseconds horizontally to the left. It is seen that the spikes and the high voltage surges are in the apparatus in accordance with this invention suppressed to a substantial extent.

While a preferred embodiment of this invention has been disclosed herein, many modifications thereof are feasible. This invention, then, is not to be restricted except insofar as is necessitated by the spirit of the prior art.

I claim as my invention:

1. Apparatus for arc melting or arc welding work or the like from an alternating-current supply comprising rectifier means, reactive means connected to said rectifier means for connecting said rectifier means to said supply for deriving direct current from said supply, said rectifier means having electrically positive and negative output terminals between which said direct current is transmitted, positive and negative conductors connected respectively to said positive and negative terminals and to be connected to said work for producing an arc at said work, a network including a resistor and a capacitor connected in parallel, a rectifier, and means connecting said rectifier and said network in series between said terminals with said rectifier poled to conduct positive current from said positive terminal to said negative terminal, said capacitor having a capacity adequate to absorb the transient produced by the electrical variations of said arc.

2. Apparatus for arc melting or arc welding work or the like from a polyphase supply comprising a reactive polyphase transformer circuit having a primary and a plurality of secondaries, means connected to said primary for connecting said primary to said supply, a silicon-diode rectifier bridge associated with each secondary, means connecting each bridge in rectifying relationship with its associated secondary, each bridge when so connected having electrically positive and negative poles, positive and negative conductors to be connected to said work for producing an arc at said work, means connecting said positive conductor to said positive poles, means connecting said negative conductor to said negative poles, a network including a capacitor and a resistor connected in parallel, and a silicon-diode rectifier connecting said network between said positive poles and said negative poles with said rectifier poled to conduct electrically positive current from said positive poles to said negative poles, said capacitor having a capacity adequate to suppress surges produced by the electrical variations of said arc.

3. Apparatus for arc melting or arc welding work or the like from an alternating-current supply comprising rectifier means, means connected to said rectifier means for connecting said rectifier means to said supply for deriving direct current from said supply, said rectifier means having electrically positive and negative output terminals between which said direct current is transmitted, positive and negative conductors connected respectively to said positive and negative terminals and to be connected to said work for producing an arc at said work, a network including a resistor and a capacitor connected in parallel, a rectifier, and conductors having a minimum of distributed impedance connecting said rectifier and said network in series between said terminals with said rectifier poled to conduct positive current from said positive terminal to said negative terminal, said capacitor having a capacity adequate to absorb the transient produced by the electrical variations of said arc.

4. Rectifier apparatus including conductors for supplying alternating current, rectifier means connected in rectifying relationship with said conductors to derive direct current from said conductors, said rectifier means having electrically positive and electrically negative terminals, a network including a resistor and a capacitor connected in parallel, an auxiliary rectifier, and conductors having as low distributed impedance as practicable connecting said auxilary rectifier and said network in series between said terminals.

5. Rectifier apparatus including conductors for supplying alternating current, rectifier means of the silicon diode type connected in rectifying relationship with said conductors to derive direct current from said conductors, said rectifier means having electrically positive and electrically negative terminals, a network including a resistor and a capacitor connected in parallel, an auxiliary rectifier, and conductors having as low distributed impedance as practicable connecting said auxiliary rectifier and said network in series between said terminals.

6. Rectifier apparatus including conductors for supplying alternating current, rectifier means of the silicon diode type connected in rectifying relationship with said conductors to derive direct current from said conductors, said rectifier means having electrically positive and electrically negative terminals, a network including a resistor and a capacitor connected in parallel, an auxiilary rectifier, and conductors having as small a length as practicable connecting said auxiliary rectifier and said network in series between said terminals.

7. Apparatus for arc melting or arc welding work or the like from an alternating-current supply comprising rectifier means, means connected to said rectifier means for connecting said rectifier means to said supply for deriving direct current from said supply, said rectifier means having electrically positive and negative output terminals between which said direct current is transmitted, positive and negative conductors connected respectively to said positive and negative terminals and to be connected to said work for producing an arc at said work, a network including a resistor and a capacitor connected in parallel, a rectifier, and conductors connecting said rectifier and said network in series between said terminals with said rectifier poled to conduct positive current from said positive terminal to said negative terminal, said capacitor having a capacity adequate to absorb the transient produced by the electrical variations of said arc.

References Cited in the file of this patent

UNITED STATES PATENTS

| | | |
|---|---|---|
| 1,357,257 | Slepian | Nov. 2, 1920 |
| 2,011,395 | Cain | Aug. 13, 1935 |
| 2,200,233 | Whitehead | May 7, 1940 |
| 2,213,091 | Morack | Aug. 27, 1940 |
| 2,275,881 | Bany | Mar. 10, 1942 |
| 2,294,863 | Hadfield | Sept. 1, 1942 |
| 2,637,769 | Walker | May 5, 1953 |
| 2,752,529 | Croco et al. | June 26, 1956 |
| 2,763,811 | Williams | Sept. 18, 1956 |
| 2,786,160 | Bichsel | Mar. 19, 1957 |
| 2,800,571 | Glenn et al. | July 23, 1957 |